Oct. 6, 1970   M. POUCHER   3,531,935
GAS TURBINE ENGINE
Filed June 17, 1968

Inventor
MICHAEL POUCHER
By
Cushman, Darby & Cushman
Attorneys

United States Patent Office 3,531,935
Patented Oct. 6, 1970

3,531,935
GAS TURBINE ENGINE
Michael Poucher, Duffield, Derby, England, assignor to Rolls-Royce Limited, Derby, England, a British company
Filed June 17, 1968, Ser. No. 737,755
Claims priority, application Great Britain, July 17, 1967, 32,769/67
Int. Cl. F02c 7/06; F04d 29/00; F01m 1/00
U.S. Cl. 60—39.08                                   2 Claims

ABSTRACT OF THE DISCLOSURE

A gas turbine engine has a shaft which carries a turbine of the engine, the shaft being provided with a plurality of adjacent sealing ribs which are spaced from but are in sealing relationship with a further shaft arranged concentrically of the first shaft. Lubricating oil is supplied to the space between the said sealing ribs and the further shaft to improve the seal effected by the sealing ribs.

---

Figures 1, 2:
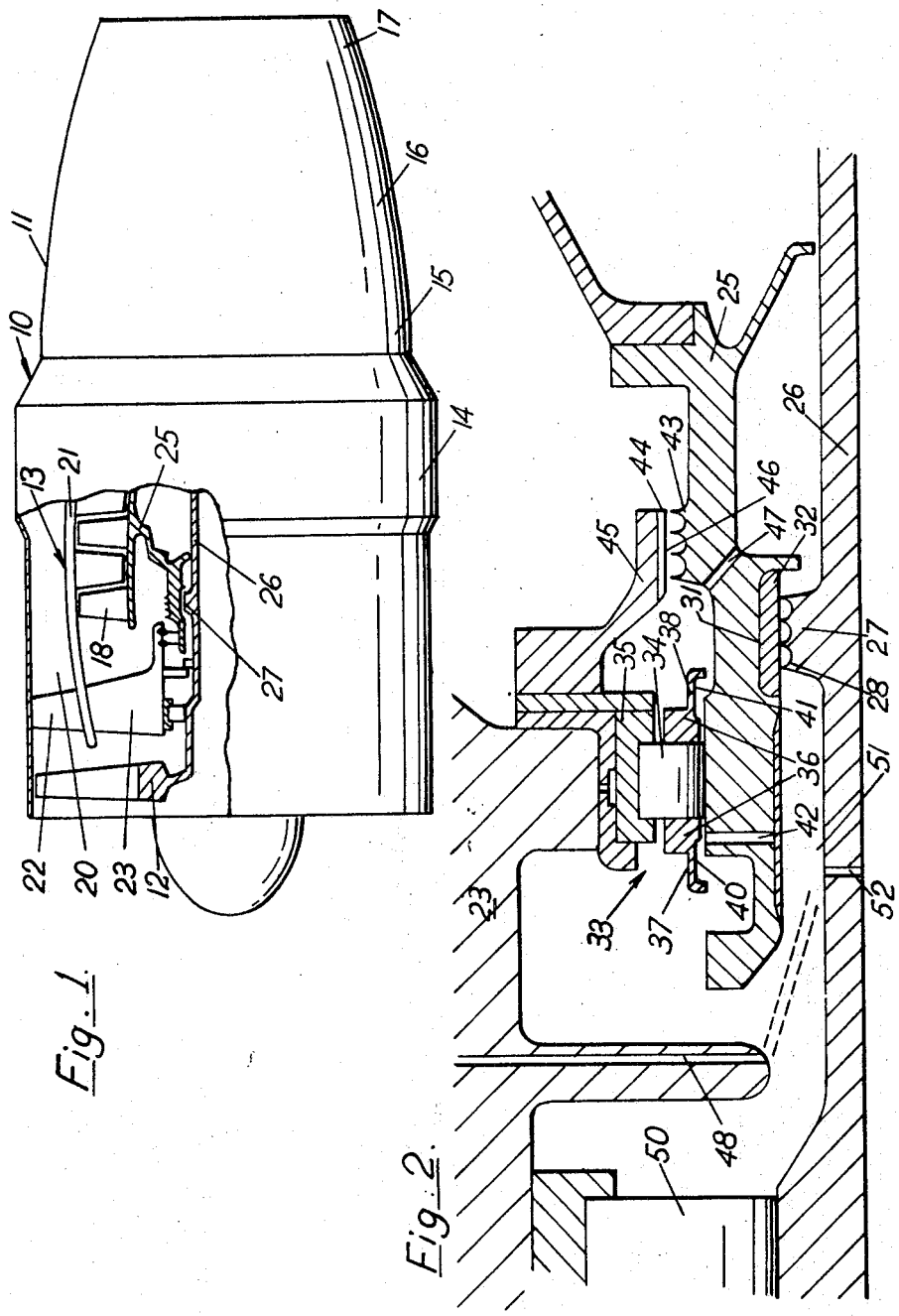

This invention concerns a gas turbine engine.

According to the present invention, there is provided a gas turbine engine comprising: a compressor, combustion means, and a turbine in flow series; a first shaft carrying said turbine; a plurality of adjacent radially extending sealing ribs provided on said first shaft; a second shaft concentrically mounted with respect to said first shaft, said second shaft being spaced from, but in sealing relationship with, said sealing ribs of said first shaft; lubricating liquid supply means providing a continuous flow of lubricating liquid to and in the space between said sealing ribs and said second shaft for improving the seal effected by said sealing ribs; and a front bearing of the engine for one of said first and second shafts, said lubricating liquid lubricating said bearing.

If the shaft becomes slightly off balance, rub is liable to occur between the sealing ribs and the concentric member. By reason, however, of the said quantity of liquid, no increase in the size of the said space would be brought about by said off balance disposition of the shaft. Moreover, by reason of the provision of the said quantity of liquid, a smaller space may be provided between the sealing ribs and the concentric member than could normally be permitted without wear occurring to any appreciable extent.

The invention is illustrated, merely by way of example, in the accompanying drawings, in which:

FIG. 1 is a diagrammatic view, partly in section, of a gas turbine engine according to the present invention, and FIG. 2 is a broken-away sectional view on a larger scale of the structure shown in FIG. 1.

In FIG. 1 of the drawings, there is shown a gas turbine engine 10 having an engine casing 11 within which there are mounted in flow series a front fan 12, a compressor 13, combustion equipment 14, contra-rotating high and low pressure turbines 15, 16 the turbine exhaust gases being directed to atmosphere through an exhaust duct 17.

Radially outwardly of the compressor 13 is a bypass duct 20 whose walls are constituted by the engine casing 11 and a compressor casing 21. The compressor casing 21 is rigidly connected to the engine casing 11 by a plurality of struts 22. Extending radially inwardly of the upstream end of the compressor casing are a plurality of support struts 23.

The compressor 13 has plurality of rotor blades 18 which extend radially from a shaft 25 which carries the compressor 13 and high pressure turbine 15. Mounted concentrically within the shaft 25 is a shaft 26 which is in contra-rotating relationship therewith and which carries the front fan 12 and the low pressure turbine 16.

The shaft 26 is provided with a labyrinth seal 27 having a plurality of radially extending adjacent sealing ribs 28. These sealing ribs are in sealing relationship with a sealing surface 31 of the shaft 25 but are spaced therefrom by a space 32 therebetween. The sealing surface 31 may be dished as shown in FIG. 2.

The upstream end of the shaft 25 is journalled in a bearing 33 carried by the support struts 23. The bearing 33 comprises roller bearings 34 mounted between the shaft 25 and an outer race 35 fixed to the support struts 23. The bearing 33 also has a bearing cage 36, having axially outwardly extending flanges 37, 38 which, together with the shaft 25, define lubricant traps 40, 41.

The shaft 25 has, on the upstream side of the bearing 33, a plurality of drillings 42 therethrough and, on the downstream side of the bearing 3, an air labyrinth seal 43. The latter is spaced by a gap 46 from a sealing surface 44 on an annular flange 45, the flange 45 being fixed to the support struts 23. Between the bearing 33 and the labyrinth seal 43 further drillings 47 are provided through shaft 25.

Extending radially inwardly from at least one of the support struts 23 is a lubricant conduit 48. Upstream of the lubricant conduit 48 is a bearing 50 of the fan 12.

In operation, lubricant liquid flows continuously from the conduit 48 and passes through a passage 51 between the shafts 25 and 26 to the labyrinth seal 27. The lubricant liquid fills the space 32 forming, on account of the centrifugal forces acting on the lubricant liquid, a bath therein, thus improving the seal, and lessening the wear between the sealing ribs 28 and sealing surface 31. A portion of the oil passing through the passage 51 is centrifuged through the drillings 42 and is then retained in the trap 40 and fed to the roller bearings 34. The excess lubricant conducted through the bearing 33 passes through the trap 41 and thence through the drillings 47 in the shaft 25, to join the lubricant passing through the labyrinth seal 27. The lubricant is then pumped, for example, by scavenging pumps, not shown, to be returned to conduit 48.

Alternatively, lubricant fluid may be fed to the labyrinth seal 27 and bearing 33 by lubricant liquid passing through a plurality of drillings 52 provided in shaft 26.

What is claimed is:

1. A gas turbine engine comprising: a compressor, combustion means, and a turbine in flow series; a first shaft carrying said turbine; a plurality of adjacent radially extending sealing ribs provided on said first shaft; a second shaft concentrically mounted with respect to said first shaft, said second shaft being spaced from, but in sealing relationship with, said sealing ribs of said first shaft; lubricating liquid supply means providing a continuous flow of lubricating liquid to and in the space between said sealing ribs and said second shaft for improving the seal effected by said sealing ribs; and a front bearing of the engine for one of said first and second shafts, said lubricating liquid lubricating said bearing.

2. A gas turbine engine as claimed in claim 1, including a front fan connected to said first shaft.

References Cited

UNITED STATES PATENTS 2,411,124  11/1946  Baumann _____ 253—39
2,966,296  12/1960  Morley et al. _____ 230—116

(Other references on following page)

UNITED STATES PATENTS

| | | | |
|---|---|---|---|
| 3,135,562 | 6/1964 | Davies et al. | 308—186 |
| 3,264,043 | 8/1966 | Keen | 308—187 |
| 3,285,004 | 11/1966 | Hopley | 308—187 |
| 3,285,566 | 11/1966 | Schmitz et al. | 253—39 |
| 3,393,024 | 7/1968 | Rhodes et al. | 253—39 |
| 1,732,761 | 10/1929 | Marsland | 103—111 |
| 2,935,363 | 5/1960 | Schindel | 308—187 |

FOREIGN PATENTS

| | | |
|---|---|---|
| 179,525 | 6/1922 | Great Britain. |
| 1,122,005 | 5/1956 | France. |

HENRY F. RADUAZO, Primary Examiner

U.S. Cl. X.R.

184—6; 308—187; 417—372